3,556,754
COATING COMPOSITIONS FOR GLASS FIBERS
James G. Marsden, Tonawanda, and Samuel Sterman, Williamsville, N.Y., assignors to Union Carbide Corporation, a corporation of New York
No Drawing. Continuation of application Ser. No. 454,705, May 10, 1965. This application June 27, 1969, Ser. No. 840,593
Int. Cl. C03c *25/02;* C08g *31/18*
U.S. Cl. 65—3                            5 Claims

ABSTRACT OF THE DISCLOSURE

This application relates to binder compositions for treating fibrous glass. The compositions contain a film-forming organic compound, a coupling agent (i.e., a metal complex, a silane or a siloxane) and a hydrolytically stable siloxane-oxylalkylene copolymer. The block copolymer functions both as an antistatic agent and as a lubricant for the glass fibers. Mixtures containing only the coupling agent and the block copolymer are claimed as well as the above-mentioned compositions and a process for treating glass fibers therewith.

---

This application is a continuation of applicants' copending U.S. application Ser. No. 454,705, filed May 10, 1965, now abandoned.

This invention relates to coating compositions suitable for sizing glass fibers, which compositions contain certain organosilicon polymers that serve as both lubricants and anti-static agents, and to glass fiber coated with such coating compositions. More particularly, the coating compositions of this invention contain, as the lubricant and anti-static agent, a siloxane-oxyalkylene copolymer.

Glass fibers have considerable utility as textile fabrics and as reinforcing materials for molding and laminating resins. These fibers are conventionally prepared by melting glass, passing the molten glass through multiple orificed bushing (or spinnerette) to form thin streams of molten glass, drawing and hardening the thin streams of glass into filaments and then gathering them into fiber strands which are then taken up on rolls. Hardening is usually achieved by cooling the hot filaments (e.g., in air or if necessary in a gas stream or fine water spray). When the filaments emerge from the orifices of the bushing they are initially kept separate, but generally come in contact with each other at guides over which they are carried after hardening and on the pick up rolls. It is often desirable that the surface of the individual filaments be properly coated or sized prior to coming into contact with each other especially on the pick up rolls. This procedure serves a number of functions such as improving wettability of the fibers by resins. Sizing also serves to lubricate the fibers so as to provide protection against abrasion and, in addition, serves to improve the handling and processing characteristics thereof.

When glass fiber is employed as a reinforcing material for laminating and molding resins it is used, for the most part, in the form of a woven mat, or in the form of individually cut short lengths of fiber. Because of the tendency to pick up static electric charges, either during formation of the fibers or during the cutting process, glass fibers are often and sometimes always treated with anti-static agents. Use of these agents on cut fibers enables them to be uniformly distributed throughout molding or laminating compositions. Without an adequate anti-static agent the fibers, due to the electro-static charges on them, will repel each other causing uneven distribution of the fibers in the composition.

Sizing of glass fibers or filaments is generally accomplished by applying a coating composition (usually referred to in the art as a "binder" composition) to the surface of the fibers immediately after the fibers have been extruded, and before they have been cut into staple lengths. These coating compositions or binder compositions generally contain, as their essential ingredients, (1) a film former, (2) a lubricant and (3) an anti-static agent. When the glass fibers are intended to be used ultimately in combination with a resin, (e.g., in a glass fiber-resin laminate), the coating composition will usually also contain (4) a coupling agent to improve the bond between the glass fibers and the resin. The particular coating composition employed to treat glass fibers is determined by the intended use of the fibers. When the glass fibers are to be used as a reinforcing agent for a resinous system, the coating composition must for obvious reasons be one which will be compatible with the resinous system.

In addition to imparting lubricity and preventing build up of static electric charges, satisfactory lubricants and anti-static agents must be compatible with other component(s) of the coating or sizing compositions, and, in addition, must not interfere with the development of good physical properties in the ultimate resinous articles which the glass fibers are intended to reinforce.

A commonly used prior art anti-static for glass fibers is methacrylate chromic chloride, which is generally supplied in an isopropyl alcohol solution. This anti-static agent is not entirely satisfactory and in addition since it is a chromium salt, produces a green shade on the sized glass fibers which is often considered objectionable. Other prior art anti-static agents such as the cationic finishing agents have other disadvantages, associated with their use as they have been found to reduce the wet strength of reinforced resinous articles made from glass fibers treated therewith.

It is an object of this invention to provide a coating composition suitable for sizing glass fibers which contains an organosilicon polymer that serves both as an improved fiber lubricant and as improved anti-static agent.

It is another object of this invention to provide glass fibers coated with the above improved coating compositions.

It is still another object of this invention to provide a sizing composition for glass fibers which has improved anti-static properties, which need not be a chromium containing material, thus, eliminate green coloration of the fibers to which it is applied, and which imparts better wet strength to glass fiber reinforced resinous articles than were heretofore obtainable.

These and other objects are achieved by the present invention which consists of a coating composition suitable for sizing glass fibers comprising (1) a major amount of a film-former (i.e., a film-forming organic compound capable of forming a solid continuous coating on glass fibers), (2) a minor amount of a coupling agent capable of bonding glass fibers coated therewith to an organic resin, and (3) a minor amount of a lubricant and anti-static agent in the form of a siloxaneoxyalkylene copolymer as defined hereinbelow.

The siloxane-oxyalkylene copolymers useful in this invention as lubricants and anti-static agents are of the class that are known as "block" copolymers. Block copolymers are composed of at least two sections or blocks, at least one section or block composed of one type of recurring units or groups (e.g., siloxane units as in the copolymers useful in this invention) and at least one other section or block composed of a different type of recurring units or groups (e.g., oxyalkylene groups as in the copolymers useful in this invention). The copolymers useful in this invention contain one or more siloxane blocks and one or more oxyalkylene blocks. These copolymers are preferably liquids that are not reactive, hardenable, or curable when applied to the glass fibers.

The siloxane blocks in the block copolymers useful in this invention contain at least two siloxane units that are represented by the formula (1) $$R_bSiO_{\frac{4-b}{2}}$$

wherein R is a monovalent hydrocarbon group, a halogen-substituted monovalent hydrocarbon group, or a divalent hydrocarbon group and $b$ has a value from 1 to 3 inclusive. Preferably, each R contains from one to about twenty carbon atoms. The groups represented by R can be the same or different in any given siloxane unit or throughout the siloxane block, and the value of $b$ in the various siloxane units in the siloxane block can be the same or different. The divalent groups represented by R link the siloxane block to the oxyalkylene block. Each siloxane block contains at least one group represented by Formula 1 wherein at least one group represented by R is a divalent hydrocarbon group which joins the siloxane block to the oxyalkylene block. The siloxane block has a ratio of hydrocarbon groups to silicon atoms from 1:1 to 3:1.

Illustrative of the monovalent hydrocarbon groups that are represented by R in Formula 1 are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl and terphenyl groups); the aralkyl groups (for example, the benzyl and the phenylethyl groups); the alkaryl groups (for example, the styryl, tolyl, and n-hexylphenyl groups); and the cycloalkyl groups (for example, the cyclohexyl group).

Illustrative of the halogen-substituted monovalent hydrocarbon groups that are represented by R in Formula 1 are the chloromethyl, trichloroethyl, perfluorovinyl, perfluoropropyl, para-bromobenzyl, iodophenyl, alpha-chloro-beta-phenylethyl, para-chlorotolyl and bromocyclohexyl groups and the like.

Illustrative of the divalent hydrocarbon groups represented by R in Formula 1 are the alkylene groups (such as the methylene, ethylene, propylene, butylene, 2,2-dimethyl-1,3-propylene, decylene and eicosylene groups), the arylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulas:

$$-CH_2CH_2SiO_{1.5}, \quad -CH_2\overset{CH_3}{\underset{|}{C}}HCH_2SiO_{1.0} \quad \text{and} \quad -CH_2CH_2\overset{CH_3}{\underset{\underset{CH_3}{|}}{Si}}O_{0.5}$$

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane units that are represented by Formula 1 wherein either the same hydrocarbon groups are attached to a silicon atom (e.g., the dimethylsiloxy, diphenylsiloxy and diethylsiloxy groups) or different hydrocarbon groups are attached to a silicon atom (e.g., the methylphenylsiloxy, phenylethylmethylsiloxy and ethylvinylsiloxy groups).

The siloxane block in the block copolymers useful in this invention can contain one or more types of siloxane units that are represented by Formula 1 provided that at least one group has at least one divalent hydrocarbon substituent. By way of illustration, only ethylenemethylsiloxy groups $$\left[ \underset{(C_2H_4)}{\overset{CH_3}{\underset{|}{Si}}O} \right]$$

can be present in the siloxane block or the siloxane block can contain more than one type of siloxane group, e.g., the block can contain both ethylene methylsiloxy groups and diphenylsiloxy group, or the block can contain ethylenemethylsiloxy groups, diphenylsiloxy groups and diethylsiloxy groups.

The siloxane block contained in the block copolymers useful in this invention can contain trifunctional siloxane units (e.g., monomethylsiloxane groups, $CH_3SiO_{1.5}$), difunctional siloxane groups (e.g., dimethylsiloxane groups, $(CH_3)_2SiO-$), monofunctional siloxane units (e.g., trimethylsiloxane units, $(CH_3)_3SiO_{0.5}$), or combinations of these types of siloxane units having the same or different substituents. Due to the functionality of the siloxane groups, the siloxane block can be predominately linear or cyclic or crosslinked or it can have combinations of these structures.

The siloxane block contained in the block copolymers useful in this invention can contain organic end-blocking or chain terminating organic groups as well as the monofunctional siloxane chain terminating groups encompassed by Formula 1. By way of illustration, the siloxane block can contain each organic end-blocking groups as the hydroxyl group, the aryloxy groups (such as the phenoxy group), the alkoxy groups (such as the methoxy, ethoxy, propoxy and butoxy groups), the acyloxy groups such as the acetoxy group, and the like.

The siloxane blocks in the block copolymers useful in this invention each contain at least two siloxane units that are represented by Formula 1. Preferably, the siloxane blocks contain a total of at least three siloxane units that are represented by Formula 1 and by Formula 2 below. That part of the average molecular weight of the copolymer that is attributable to the siloxane blocks can be as high as 50,000 or greater.

A siloxane block can contain, in addition to the groups represented by Formula 1, one or more siloxane units represented by the formula:

(2) $$R_e\overset{H_f}{\underset{|}{Si}}O_{\frac{4-e-f}{2}}$$

wherein R has the meaning defined in Formula 1, $e$ has a value from 0 to 2, $f$ has a value from 1 to 2 and $e$ plus $f$ has a value from 1 to 3.

The oxyalkylene blocks in the block copolymers useful in this invention each contain at least one oxyalkylene group represented by the formula:

(3) $$[-R'O-]$$

wherein R' is an alkylene group. Preferably, the alkylene group represented by R' in Formula 3 contains from two to about ten carbon atoms, and most preferably from two to three carbon atoms. Illustrative of the oxyalkylene groups that are represented by Formula 3 are the oxyethylene, oxy-1,2-propylene, oxy-1,3-propylene, oxy-2,2-dimethyl-1,3-propylene, oxy-1,10-decylene groups, and the like.

The oxyalkylene blocks in the block copolymer useful in this invention can contain one or more of the various types of oxyalkylene groups represented by Formula 3. By way of illustration, the oxyalkylene blocks can contain only oxyethylene or onyl oxypropylene groups or both oxypropylene groups and oxyethylene groups, or other combinations of the various types of oxyalkylene groups represented by Formula 3.

The oxyalkylene blocks in the block copolymers useful in this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also a single group can serve as an end-block group for more than one oxyalkylene block. For example, the glyceroxy group

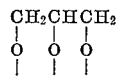

can serve as an end-blocking group for three oxyalkylene chains.

The oxyalkylene blocks in the block copolymers useful in this invention each contain at least one oxyalkylene groups that are represented by Formula 3. Preferably, each block contains at least five such groups. That part of the average molecular weight of the copolymer that is attributable to the oxyalkylene blocks can be 50,000 or greater.

The oxyalkylene block can contain a carbonyl group

Such groups can be present at the end of the block, e.g., when the copolymer is produced from a carboxy alkylsiloxane (or a derivative thereof) and an oxyalkylene compound. Thus the following structures can be present in the copolymers:

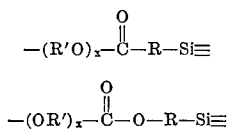

The block copolymers useful in this invention can contain siloxane blocks and oxyalkylene blocks in any relative amount. The copolymer can contain, for example, from 5 parts by weight up to 95 parts by weight of siloxane blocks and from 5 parts by weight to 95 parts by weight of oxyalkylene blocks per 100 parts by weight of the copolymer. Preferably, the copolymer contain 5 parts by weight to 50 parts by weight of the siloxane blocks and from 50 parts by weight to 95 parts by weight of the oxyalkylene blocks per 100 parts by weight of the copolymer.

The block copolymers useful in this invention can contain more than one of each of the blocks and the blocks can be arranged in various configurations such as linear, cyclic or branched configurations. By way of illustration, the following classes of compounds are among the siloxane-oxyalkylene block copolymers useful in this invention:

(A) Copolymers that contain at least one unit that is represented by the formula:

(4)
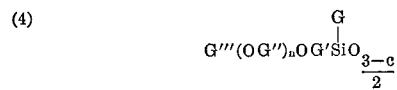

(B) Copolymers that contain at least one unit that is represented by the formula:

(5)
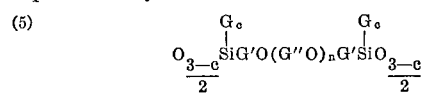

(C) Copolymers that contain at least one unit that is represented by the formula:

(6)
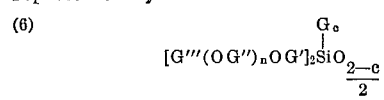

In the above Formulas 4, 5, and 6, G is a monovalent hydrocarbon radical, or halogen-substituted monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation, $n$ is an integer having a value of at least four, and $c$ has a value from 0 to 2 in Formulas 4, and 5 and a value from 0 to 1 in Formula 6. In Formulas 4, 5, and 6, G can represent the same or different radicals, $n$ preferably has a value from 5 to 30 and G'' can represent the same or different radicals, i.e., the group $(OG'')_n$ can represent, for example, the groups: $—(OC_2H_4)_p—$,

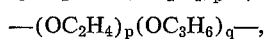

$—(OC_3H_6)_p—$ or $—(OC_2H_4)_p(OC_8H_{16})_q—$, where $p$ and $q$ are integers.

The monovalent dydrocarbon radicals and halogen-substituted monovalent hydrocarbon radicals represented by G in Formulas 4, 5, and 6, can be saturated or olefinically unsaturated or can contain benzenoid unsaturation. Illustrative of the monovalent hydrocarbon radicals represented by G are the linear aliphatic radicals (e.g., the methyl, ethyl, decyl, octadecyl and eicosyl radicals, the cycloaliphatic radicals (e.g., the cyclohexyl and the cyclopentyl radicals), the aryl radicals (e.g., the phenyl, tolyl, xylyl, naphthyl and terphenyl radicals), the aralkyl radicals (e.g., the benzyl and betaphenylethyl radicals), the unsaturated linear aliphatic radicals (e.g., the vinyl, allyl and hexenyl radicals) and the unsaturated cycloaliphatic radicals (e.g., the cyclohexenyl radical).

Illustrative of the halogen-substituted momovalent hydrocarbon radicals represented by G are the chloromethyl, trichloroethyl, perfluorovinyl, para-bromobenzyl, iodophenyl, alpha-chloro-beta-phenylethyl, parachlorotolyl and bromocyclohexyl groups and the like.

Preferably, the G and G' groups [included in the definition of R in Formulas 1 and 2 above] contain from one to twenty carbon atoms and the G'' groups [included in the definition of R' in Formula 3 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 4, 5, and 6, are the alkylene radicals (e.g., the methylene, ethylene, 1,3-propylene, 1,4-butylene, 1,12-dodecylene and 1,20-eicosylene radicals), and the arylene radicals (e.g., the phenylene radical), and the alkarylene radicals (e.g., the phenylethylene radicals). In Formulas 4, 5, and 6, G' is preferably an alkylene radical containing at least two carbon atoms.

Illustrative of the alkylene radicals containing at least two carbon atoms represented by G'' in Formulas 4, 5, and 6 are the ethylene, 1,2-propylene, 1,3-propylene, 1,6-hexylene, 2-ethylhexylene-1,6, and 1,10-decylene radicals.

Illustrative of the radicals represented by G''' in Formulas 4, 5, and 6, are the saturated linear or branched chain aliphatic hydrocarbon radicals (e.g., the methyl, ethyl, propyl, n-butyl, tert.-butyl, and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals) and the aralkyl hydrocarbon radicals (e.g., the benzyl and beta-phenylethyl radicals).

The following are representative of the latter class of siloxane-oxyalkylene copolymers useful in the invention. In the formulas, "Me" represents the methyl group ($CH_3—$), and "Bu" represents the butyl group ($C_4H_9—$).

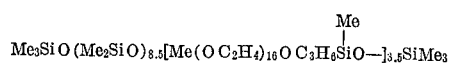

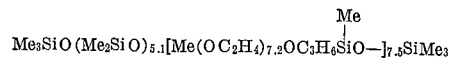

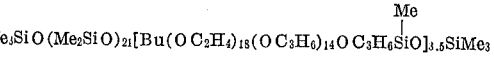

Among the siloxane-oxyalkylene copolymers that are especially suited for use in this invention are those having the formula

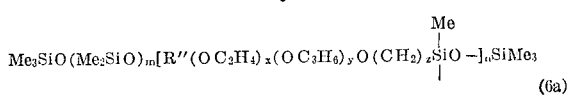

(6a)

wherein "Me" is a methyl group, $m$ has a value from 0 to 25 inclusive, $n$ has a value from 1 to 10 inclusive, $x$ has a value from 3 to 25 inclusive, $y$ has a value from 0 to 25 inclusive, $z$ has a value from 2 to 3 inclusive and R'' is an alkyl group containing from 1 to 4 carbon atoms inclusive.

The film formers employed in the compositions of this invention are materials used in conventional glass fiber sizing or binder compositions. Such materials are organic compounds capable of forming continuous solid films or coatings on glass fibers. The purpose of the film former is manyfold. It must offer protection to the glass fiber during processing, hold the individual fibers together to maintain the integrity of the strand, give adequate release so that the packages of strand may be unfound during processing and use and be compatible with the resin that the treated glass is used to reinforce.

The film-formers suitable for use in coating compositions of this invention include naturally occurring materials, for example, starches, such as corn starch, potato starch, tapioca starch and sago flour; gums, such as gum arabic, gum tragacanth and gum karay; glues, such as gelatin and animal glues; casein; glucose, cellulosic materials such as carboxymethyl cellulose, hydroxyethyl cellulose, methyl cellulose; oxyethylated stearates; and synthetic resins, such as ureaformaldehyde polymers, melamine-formaldehyde polymers, acetoneformaldehyde polymers, phenol-formaldehyde polymers; alkyd resins such as glyceryl-phthalic anhydride reaction products; polyamides, saturated and unsaturated polyesters, hydrocarbon-siloxane resins, epoxy resins; vinyl resins such as homopolymers and copolymers of ethylene, propylene, styrene, isobutylene, butadiene, acrylonitrile, vinyl chloride, vinyl pyrrolidone, vinylidene chloride, vinyl acetate, vinyl alcohol acrylic acid and ester thereof, methacrylic acid and esters thereof, and the like. Mixtures of these film-formers may also be employed. These film-formers are preferably used in the form of aqueous solutions or emulsions. Such film-formers can be free of silicon.

The particular film-former employed is governed by the ultimate use of the fibers treated with the compositions of this invention. Thus, where the treated fibers are to be employed in the production of glass-reinforced laminates, preferred film-formers are polyvinyl acetate, polyvinyl pyrrolidone, polyacrylate and polymethacrylate esters, polyacrylamide, polymethacrylamide, saturated polyesters, unsaturated polyesters, epoxy resins, melamine resins, phenolic resins and copolymers and mixtures of these materials. The choice of a particular film-former depends upon a number of factors including the form in which the glass will be used (i.e., continuous strand, chopped strand, mat, woven roving, etc.) and the resin system in which the glass is to serve as reinforcement. Polyvinyl acetate is commonly used as the film-former in systems where the resin to be reinforced is unsaturated polyester although the use of polyester resins as the film-former in these systems is growing in importance. Glass to be used in epoxy or phenolic resin systems commonly uses as film-former a saturated polyester resin modified with polyvinyl pyrrolidone although epoxy resin are also used in these systems. On the other hand, where the treated glass fibers are to be used in producing glass yarn, preferred film-formers are starches, casein and the like.

Coupling agents are employed in the compositions of this invention to improve the bond between glass fibers treated with the composition and subsequently applied organic resins (e.g., where the treated glass fiber is used to produce a glass fiber-reinforced laminate). Suitable coupling agents include both silicon-free and organosilicon compounds. Illustrative of suitable silicon-free coupling agents is a methacrylic acid complex of chromium ("Volan").

Illustrative of organosilicon coupling agents suitable for use in the compositions of this invention are silanes having the formula:

(7)

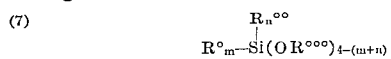

wherein R° is an organic group bonded to the silicon atom by a carbon to silicon bond and contains a functional group reactive with an organic resin, R°° is a monovalent hydrocarbon group free of aliphatic unsaturation as defined for R in Formula 1, R°°° is R°° or alkoxyalkyl (e.g., $CH_3OCH_2CH_2$— or $C_2H_5OCH_2CH_2$—), $m$ has a value from 1 to 3 inclusive, $n$ has a value from 0 to 2 inclusive and $(m+n)$ has a value from 1 to 3 inclusive.

Typical of the functional groups in R° in Formula 7 are the olefinic (—C=C—), amino, hydroxyl, and epoxy groups. Thus R° can be a gamma-acryloxypropyl, gamma-methacryloxypropyl, vinyl, cyclohexenyl, gamma-aminopropyl, delta-aminobutyl, N-aminoethyl-gamma-aminopropyl, N,N - bis - (hydroxyethyl)gamma-aminopropyl, gamma-glycidoxypropyl or beta-epoxycyclohexylethyl group or the like.

Other suitable organosilicon coupling agents are siloxanes consisting essentially of groups having the formula:

(8)

$$R°_m Si O_{\frac{4-(m+n)}{2}}^{R°°_n}$$

wherein R°, R°°, $m$, $n$ and $(m+n)$ are as defined above for Formula 7.

Still other suitable organosilicon coupling agents are those consisting essentially of from 10 to 90 mole percent of units represented by Formula 8 and from 10 to 90 mole percent of units represented by Formula 1 wherein R is a monovalent hydrocarbon group.

The particular coupling agent employed is a compound that has a functional group reactive with the particular organic resin to be used with the treated glass fibers. The following combinations are illustrative:

| Organic resin | Coupling agent |
|---|---|
| Unsaturated polyester resin | $CH_2=CHSi(OCH_2OCH_3)_3$ <br> $CH_2=C(CH_3)COO(CH_2)_3Si(OCH_3)_3$ <br>  |
| Epoxy resin | $H_2N(CH_2)_3Si(OC_2H_5)_3$ <br> $(HOCH_2CH_2)_2N(CH_2)_3Si(OC_2H_5)_3$ |
| Melamine resin | $H_2N(CH_2)_3Si(OC_2H_5)_3$ |
| Phenolic resin | $H_2N(CH_2)_3Si(OC_2H_5)_3$ |

The relative amounts of film-former, coupling agent and siloxane-oxyalkylene copolymer employed in the compositions of this invention are not narrowly critical. The relative amounts of these materials will vary from application to application depending on the specific materials used and the specific results desired. In general, the usually preferred and most desirable relative amounts of the materials are as follows:

|  | Parts by weight per 100 parts by weight of the film-former | |
|---|---|---|
|  | Preferred | Most desirable |
| Coupling agent | 1 to 40 | 5 to 25. |
| Siloxane-oxyalkylene copolymer | 1 to 40 | 5 to 25. |

The amounts of the compositions of this invention loaded on glass fibers is not narrowly critical and can be varied from application to application as desired or necessary. A minor amount is used based on the weight of the glass. In general a loading of from 0.1 to 2.5 parts by weight of the compositions per 100 parts by weight of the fibers is preferred but a loading of from 0.7 to 1.5 parts by weight per 100 parts by weight of the fibers is most desirable.

Obviously, when the treated glass is to be used in an area where bonding to an organic resin is not important (e.g., as glass yarn for decorative fabrics), the coupling agent can be omitted from the compositions of this invention. The coupling agent can also be omitted from the composition where the treated glass is to be used with an organic resin that has already been mixed ("integrally blended") with a coupling agent. In either of the foregoing instances, improved properties are imparted to glass fibers by treating them with a composition containing the film-former and the siloxane-oxyalkylene copolymer but no coupling agent.

It is sometimes convenient to provide mixtures of only the above-described siloxane-oxyalkylene copolymer and the coupling agent which can be stored or shipped as such. Prior to use in treating glass fibers, such mixtures can be mixed with the film-former. Such mixtures can contain from 0.1 to 10 parts by weight of the copolymer per part by weight of the coupling agent.

If desired, the compositions of this invention can contain any of a wide variety of optional ingredients such as solvent, conventional lubricants or conventional anti-static agents. The use of such conventional lubricants or anti-static agents will complement, to some extent, the inherently advantageous lubricating an anti-static properties which characterize the novel compositions of this invention.

Thus, although water or an inert organic solvent is not an essential component of the coating compositions of this invention, it is often desirable to incorporate the same into the coating compositions. The solvents may be incorporated either during the initial preparation of the coating composition (either as a separate component, or as a solvent for one or the other components of the composition) or the coating composition may be prepared as a concentrate and diluted before being used. The solvent may be present in an amount ranging from about 2000 or 15,000 parts by weight of solvent per 100 parts by weight of the film-former. Preferably, from about 3000 to 10,000 parts by weight of solvent per 100 parts of film-former is used.

Conventional glass fiber lubricants useful in the coating compositions of this invention are well known in the art, and include animal as well as marine oils, fats and waxes such as carnuba oil and candalia wax; petroleum hydrocarbon oils and waxes; silicone oils, such as linear dihydrocarbonpolysiloxanes; glycerine; polyethylene glycols; polyhydric alcohol esters such as esters of diethylene and tetraethylene glycol; fatty alcohols, such as lauryl and stearly alcohol; fatty acid amides, such as pelargonamide, anhydrous acid solubilized polyunsaturated fatty acid amides, and the like. The amount of lubricant used in the coating composition may range from about 5 to 50 parts by weight of lubricant per 100 parts by weight of the film-former in the coating composition. Preferably, the lubricant is present in an amount ranging from about 10 to 30 parts by weight per 100 parts by weight of the film-former. The lubricants are preferably employed as aqueous solutions or emulsions. Conventional anti-static agents that can be present in the compositions include silicon-free anti-static agents such as a methacrylic acid complex of chromium chloride ("Volan") and organosilicon anti-static agents such as reaction products of soluble metal salts of the transition metals (especially zinc chloride) and aminohydrocarbonsilicon compounds (especially gamma-aminopropyltriethoxysilane).

The compositions of this invention can be formed in any convenient manner. The components can be mixed in any desired sequence employing conventional blending or mixing equipment.

The composition of this invention are most desirably applied to glass fibers after the glass fiber filaments have emerged from the bushing and hardened but before the strands of the filaments have been collected on rolls. Application of the compositions to the fibers can be achieved in any convenient manner. Thus, the filaments can be flood coated with the composition or passed over a porous absorbent material saturated with the composition. Alternately the filaments can be passed through a bath of the composition or the composition can be sprayed on the filaments. After the composition has been applied to the glass fiber filaments, the treated filaments can be air dried or heated to temperatures of from 150° F. to 250° F.

Although it is preferable to apply the composition of this invention to glass fiber filaments shortly after they have formed as described above, improved properties are also imparted to glass fibers that are already in the form of rovings, strands, mats, cloth, etc. when the compositions are applied thereto.

Glass fibers treated with the compositions of this invention have less tendency to suffer abrasion damage and have less tendency to build up an electric charge. Moreover, the treated fibers are more readily wetted by organic resins so that fiber-resin composites produced from the treated fibers have fewer, if any air pockets or bubbles, and so have improved strength. Such composites are also produced in less processing time and possess greater clarity in view of the properties imparted by the compositions of this invention.

Glass fibers coated with the composition of this invention can be fabricated into rovings or mats and then employed as reinforcing agents for both thermosetting and thermoplastic organic resins. Typical of such thermosetting resins are the unsaturated polyester, epoxy, melamine and phenolic resins and the like. Typical of such thermoplastic resins are polyethylene, polypropylene, polycarbonates, nylon, acrylonitrile-butadiene styrene copolymers and polystyrene and the like. Such reinforced resins are useful in producing automotive bodies, boat hulls, fishing rods and the like.

Glass fibers coated with the compositions of this invention can also be fabricated into yarn and then used in producing decorative fabrics.

The following abbreviations are employed in the examples appearing below:

| Abbreviation | Material* |
|---|---|
| Copolymer I | $Me_3SiO(Me_2SiO)_{21}(MeSiO)_{3.5}SiMe_3$<br>$\quad\mid$<br>$(CH_2)_3O(C_2H_4O)_{19}(C_3H_6O)_{11}C_4H_9$ |
| Copolymer II | $Me_3SiO(Me_2SiO)_{8.5}(MeSiO)_{3.5}SiMe_3$<br>$\quad\mid$<br>$(CH_2)_3O(C_2H_4O)_{16}Me$ |
| Copolymer III | $Me_3SiO(Me_2SiO)_4(MeSiO)_7SiMe_3$<br>$\quad\mid$<br>$(CH_2)_3O(C_2H_4O)_7Me$ |
| Copolymer IV | $Me_3SiO(Me_2SiO)_2(MeSiO)_{2.8}SiMe_3$<br>$\quad\mid$<br>$(CH_2)_3O(C_2H_4O)_{16}Me$ |
| Copolymer V | $Me_3SiO(MeSiO)_{1.5}SiMe_3$<br>$\quad\mid$<br>$(CH_2)_3O(C_2H_4O)_7Me$ |
| Silane A | $CH_2=C(CH_3)COO(CH_2)_3Si(OCH_3)_3$ |

*"Me" denotes the methyl group.

As used herein, "181–112 glass cloth" denotes a satin weave cloth having the following characteristics: a thickness of 10 mils, weighing about 8.9 ounces per square yard, 57 x 54 ends and picks per square inch, and a breaking strength of 375 x 350 pounds per square inch.

The following examples illustrate the present invention:

EXAMPLE I

The following evaluations illustrate the improvements provided by various siloxane-oxyalkylene copolymeric lubricants (and anti-static agents), in the physical properties of the laminated sheets. The evaluations were carried out by preparing a number of binder compositions of this invention that were identical with the exception of the lubricant, treating 181–112 (heat cleaned) glass cloth in such a manner as to pick up 0.7–0.8 wt.-percent of the composition based on the weight of the cloth, air drying the treated cloth, heat curing the treated cloth for 2.5 minutes at 135° C. and then preparing 12 ply up unsaturated polyester laminates by the conventional "wet lay up" technique. The laminates were then cured for 1 hour at 145° F. and 1 hour at 250° F. Flexural strengths were determined on the laminates both as prepared (dry) and after samples had been immersed in boiling water for 8 hours (wet). The binder composition used was:

| | Wt.-percent |
|---|---|
| Polyvinylacetate as a 50–55% wt. emulsion (film former) | 2.14 |
| Silane A (coupling agent) | 0.18 |
| Lubricant as indicated below | 0.28 |
| Water | 97.40 |

The final pH of the compositions was adjusted to 5.0–5.2. The results of the flexural strength tests are shown below.

| Lubricant | Flexural strengths, p.s.i.×10⁻³ | |
|---|---|---|
| | Dry | Wet |
| Copolymer I | 72.6 | 62.9 |
| Copolymer II | 74.9 | 61.3 |
| Copolymer III | 75.5 | 61.6 |
| Copolymer IV | 83.3 | 78.5 |
| Copolymer V | 84.1 | 80.0 |
| "AHCO-185A"* (control) | 74.1 | 59.8 |

*Conventional lubricant.

In each case, improved strength retention was obtained with the copolymers present. Also glass treated with the copolymers had better color.

EXAMPLE II

The following evaluation makes a comparison of a siloxane-oxyalkylene copolymer and a conventional organic lubricant in respect to the physical strengths of the resulting composite and the anti-static properties of the treated glass in a chopping operation. The following binder compositions were prepared:

| Components | Binder compositions | |
|---|---|---|
| | No. 1 [3] | No. 2 [3] |
| Polyvinyl acetate (film former), wt. percent | 2.14 | 2.14 |
| Silane A (coupling agent), wt. percent | 0.175 | 0.175 |
| Volan (anti-satic agent), wt. percent [1] | 0.80 | 0.80 |
| AHCO-220 (lubricant), wt. percent [2] | 0.28 | |
| Copolymer V (lubricant), wt. percent | | 0.28 |

[1] "Volan," methacrylic acid complex of chromium chloride.
[2] "AHCO-220" is an anhydrous, acid-solubilized polyunsaturated fatty acid amide.
[3] Balance was water These binder compositions were applied to glass fibers in the normal manner as formed at the glass drawing bushing. The treated fibers were cured for 5.5 hours at 235° F. and the glass (0.8 wt.-percent loading) was then converted to a four end roving. A portion of the roving prepared with each binder was used to reinforce unsaturated polyester resin rods. Flexural strengths were then determined on samples of the rod as formed (dry) and after immersion for two hours in boiling water (wet).

The anti-static properties of the two binder compositions were determined as follows:

The four end roving was passed through a small chopping gun and directed against a polished metal plate. This was continued for 15 seconds. At the end of this time the charge built up on the plate was measured using an electro-static measuring device calibrated in relative units. The device indicated a positive or negative charge and its relative magnitude. The nearer the reading to zero, irrespective of sign of the charge, the better the anti-static properties of the binder.

The following table shows the results of both the flexural strength tests and the anti-static tests.

| Binder composition | Flexural strength, p.s.i. × 10⁻³ | | Static charge |
|---|---|---|---|
| | Dry | Wet | |
| No. 1 | 163.2 | 139.3 | −10 |
| No. 2 | 174.5 | 146.5 | +1.5 |

These results illustrate the superiority of the compositions of this invention.

What is claimed is:
1. A composition suitable for treating glass fibers, said composition consisting essentially of:
   (1) a major amount of film-forming organic compound capable of forming a solid continuous coating on glass fibers;
   (2) a minor amount of a coupling agent capable of bonding glass fibers coated therewith to an organic resin; and

(3) as the only lubricant a minor amount of a siloxane-oxyalkylene block copolymer having the formula:

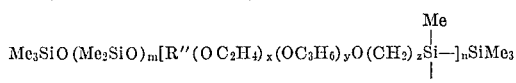
$$Me_3SiO(Me_2SiO)_m[R''(OC_2H_4)_x(OC_3H_6)_yO(CH_2)_z\overset{\displaystyle Me}{\underset{\displaystyle |}{Si}}-]_nSiMe_3$$

wherein $Me$ is a methyl group, $m$ has a value from 0 to 25 inclusive; $n$ has a value from 1 to 10 inclusive; $x$ has a value from 3 to 25 inclusive; $y$ has a value from 0 to 25 inclusive; $z$ has a value from 2 to 3 inclusive and $R''$ is an alkyl group containing from 1 to 4 carbon atoms inclusive.

2. The compositions of claim 1 wherein the coupling agent is selected from the group consisting of:

(A) silanes having the formula:

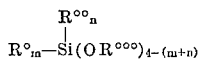
$$R°_m-\underset{\displaystyle |}{\overset{\displaystyle R°°_n}{Si}}(OR°°°)_{4-(m+n)}$$

wherein $R°$ is an organic group bonded to silicon by a carbon to silicon bond and containing a functional olefinic, hydroxyl or epoxy group reactive with an organic resin, $R°°$ is a monovalent hydrocarbon group free of aliphatic unsaturation, $R°°°$ is a member selected from the group consisting of $R°°$ and the alkoxyalkyl groups, $m$ has a value from 1 to 3' inclusive, $n$ has a value from 0 to 2 inclusive, and $(m+n)$ has a value from 1 to 3 inclusive;

(B) siloxanes consisting essentially of groups having the formula:

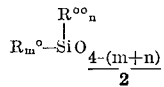
$$\frac{R_m°-\underset{\displaystyle |}{\overset{\displaystyle R°°_n}{Si}}O_{4-(m+n)}}{2}$$

wherein $R°$, $R°°$, $m$, $n$ and $(m+n)$ have the above-defined meanings; and (C) siloxanes consisting essentially of from 10 to 90 mol-percent of the latter groups and from 10 to 90 mol-percent of groups having the formula:

$$\frac{R_bSiO_{4-b}}{2}$$

wherein $R$ is a monovalent hydrocarbon group and $b$ has a value from 1 to 3 inclusive.

3. The composition of claim 1 wherein the film-forming organic compound is polyvinyl acetate.

4. A composition as defined in claim 2 wherein the coupling agent is gamma-methacryloxypropyltrimethoxysilane.

5. In a process for producing glass fiber strands by passing molten glass through a multi-orificed bushing to produce glass fiber filaments, hardening the filaments, forming the filaments into strands and collecting the strands on a pick up roll, the improvement which comprises applying a minor amount of the composition of claim 1 to the hardened filaments prior to collecting the strands on the rolls.

References Cited
UNITED STATES PATENTS

| | | | |
|---|---|---|---|
| 2,846,458 | 8/1958 | Haluska | 260—46.5(g) |
| 3,168,389 | 2/1965 | Eilerman | 65—3 |
| 3,249,412 | 5/1966 | Kolek et al. | 65—3 |
| 3,305,504 | 2/1967 | Huntington | 260—29.2(m) |

MURRAY TILLMAN, Primary Examiner
W. T. BRIGGS, SR., Assistant Examiner

U.S. Cl. X.R.

260—9, 6, 13, 29.2, 29.3, 29.4, 29.6, 46.5, 824, 825, 826, 827